United States Patent [19]

Grimm

[11] Patent Number: 4,603,594

[45] Date of Patent: Aug. 5, 1986

[54] FAIL SAFE ACTUATOR

[75] Inventor: Duane H. Grimm, Rockford, Ill.

[73] Assignee: Sundstrand Corporation, Rockford, Ill.

[21] Appl. No.: 615,772

[22] Filed: May 31, 1984

[51] Int. Cl.[4] .................. F16H 25/22; F16H 57/10
[52] U.S. Cl. .......................... 74/89.15; 74/411.5;
    74/424.8 R; 188/106 P; 188/151 A; 188/171;
    192/2; 192/4 R; 244/75 R
[58] Field of Search ........... 74/89.15, 411.5, 412 T,
    74/412 A, 424.8 R; 244/75 R, 224, 203;
    188/106 P, 171, 173, 151 A

[56] References Cited

U.S. PATENT DOCUMENTS

| 2,266,264 | 12/1941 | Reid . | |
|---|---|---|---|
| 2,444,886 | 7/1948 | Vickers | 74/424.8 R |
| 2,451,109 | 10/1948 | Nardone | 188/171 |
| 2,907,415 | 10/1959 | Norman . | |
| 3,093,213 | 6/1963 | Limoges et al. . | |
| 3,132,829 | 5/1964 | Bochman | 244/102 R |
| 3,329,244 | 7/1967 | Nielsen | 188/106 P |
| 3,478,848 | 11/1969 | Seip | 188/106 P |
| 3,611,284 | 10/1971 | Lewis . | |
| 3,695,731 | 10/1972 | England et al. . | |
| 3,724,609 | 4/1973 | Kobald . | |
| 3,791,492 | 2/1974 | Nielsen | 188/106 P |
| 3,802,281 | 4/1974 | Clarke | 74/89.15 |
| 3,848,932 | 11/1974 | Lewis . | |
| 3,914,736 | 10/1975 | Nakamura et al. . | |
| 3,980,347 | 9/1976 | Griesenbrock . | |
| 3,994,178 | 11/1976 | Hore | 74/89.15 |
| 4,036,533 | 7/1977 | Kraft . | |
| 4,063,624 | 12/1977 | Beck et al. . | |
| 4,070,644 | 1/1978 | Shellhause . | |

FOREIGN PATENT DOCUMENTS 2422865 12/1979 France ............................ 188/106 P Primary Examiner—Lawrence J. Staab
Attorney, Agent, or Firm—Wood, Dalton, Phillips, Mason & Rowe

[57] ABSTRACT

An actuator including a motor having a rotary output, an actuating arm mounted for reciprocating movement, and a mechanism, interconnecting the output and the arm to convert rotary motion to reciprocating motion. The mechanism includes a rotary element. A brake is provided including a friction plate and first and second reaction plates. A solenoid and spring are operable to move the reaction plate into or out of engagement with the friction plate and cams associated with the rotary element are operable to move the reaction plate into engagement with the friction plate.

14 Claims, 8 Drawing Figures

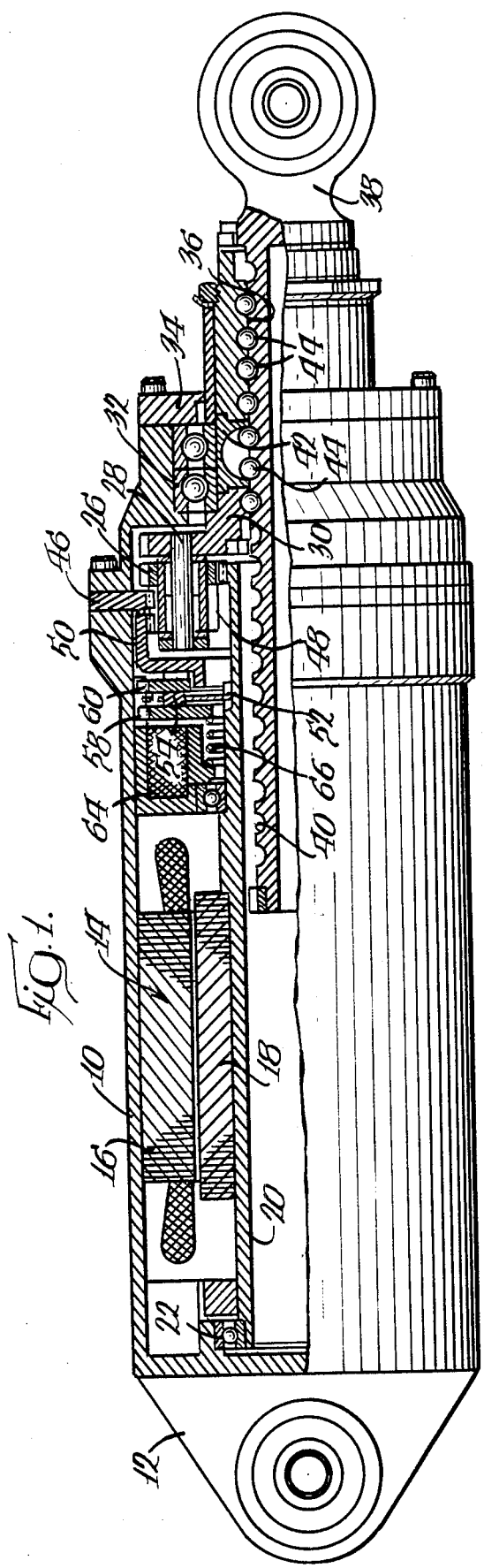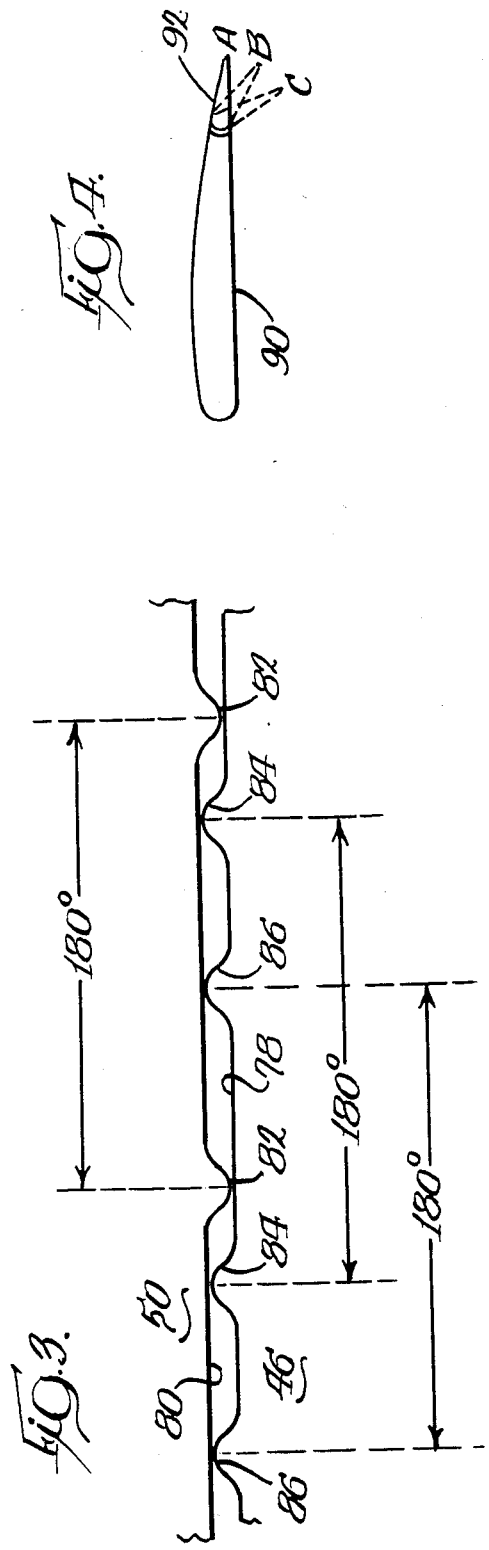

FAIL SAFE ACTUATOR

FIELD OF THE INVENTION

This invention relates to an actuator, and more particularly, to a fail safe actuator as may be employed in positioning a control surface of an aircraft or the like.

BACKGROUND OF THE INVENTION

In many aircraft, control surfaces such as flaps, spoilers, or the like are positioned by motors. Brakes may be employed to hold the control surface at a desired position once driven to such position by a motor. The brakes are utilized to absorb aerodynamic forces fed back into the driving system by the reaction of air against the control surface.

A difficulty to be guarded against is the loss of power or inoperability of the brake release mechanism. In the case of an extended aircraft flap or the like, if the brake cannot be disengaged due to power failure or mechanical failure in its release mechanism, the flap extension can not be changed when it desirably might be returned to a neutral or some other position where it would not particularly affect the aerodynamic configuration of the aircraft.

Another difficulty of concern is the possibility of inoperability in the brake and the drive mechanism. Under such circumstances, the control surface, not being subject to positioning by the drive system, and not being braked by the brake mechanism would be free to oscillate on its mounting in response to aerodynamic forces imposed on it as the aircraft moves through the air. Such oscillation could conceivably affect the structural integrity of the associated components and/or create a measure of instability because of the uncontrolled constant change in the aerodynamic configuration of the aircraft.

Another difficulty resides in the fact that certain types of control surfaces are moved quite rapidly between various positions. Where one of the positions to which a control surface is being moved is at its limit of travel, inertial loads due to rapid movement of the control surface may undesirably stress various components of the system.

The present invention is directed to overcoming one or more of the above problems.

SUMMARY OF THE INVENTION

It is the principal object of the invention to provide a new and improved fail safe actuator. More specifically, it is an object of the invention to provide such fail safe actuators particularly suited for use with control surfaces on aircraft.

An exemplary embodiment of the invention achieves the foregoing object in an actuator comprising a motor having a rotary output. An actuating element is mounted for movement through a path and is adapted to control the position of another element as, for example, a control surface on an aircraft. A gear reduction mechanism including a rotary element interconnects the output and the arm element and is operable to move the arm element through the path. A friction brake element is rotatable in response to rotation of the motor output and first and second brake reaction elements are mounted for independent movement into and out of engagement with the friction brake element and are held against rotation. Selectively operable control means are provided for moving the first reaction element into or out of engagement with the friction brake element to provide normal control of the system. Means, including a cam associated with the rotary element, are provided for moving the second reation element into and out of engagement with the friction brake element at at least one predetermined position of the actuating element along the path.

The latter means act as a supplementary brake which may be alternatively or conjunctively employed to fix the actuating element in a desired position corresponding to a desired position of an aircraft flap or control surface and/or to brake the drive system as the actuating element reaches its limits of travel.

In a preferred embodiment, the actuating element is an arm and the arm is mounted for reciprocating movement. The path of movement through which the actuating element moves is a path of reciprocating movement.

In a preferred embodiment, the invention contemplates that the brake reaction elements are mounted for axial movement into and out of engagement with the friction brake element and that such elements comprise plates.

According to one embodiment of the invention, the interconnecting mechanism additionally converts rotary motion to reciprocating motion and the reverse so as to cause reciprocation of the arm. Such mechanism preferably includes a ball nut and is additionally provided with a planetary reduction gear train.

Where a planetary gear train is utilized, the rotary output of the motor may be utilized to drive a sun gear while the ball nut is driven by a planet gear meshed with the sun gear. A stationary first ring gear is meshed with the planet gear and the rotary element comprises a second ring gear meshed with the planet gear. The teeth an the ring gears and the planet gear are constructed and arranged such that the second ring gear will rotate relative to the first ring gear upon rotation of the planet gear.

In a highly preferred embodiment utilizing a planetary gear train as set forth above, the first and second ring gears are in side by side relation and the second ring gear is movable axially relative to the first ring gear. The cam is located at the interface of the ring gear to thereby move the second ring gear axially to control movement of the second reaction plate.

Other objects and advantages will become apparent from the following specification taken in connection with the accompanying drawings.

DESCRIPTION OF THE DRAWINGS

FIG. 1 is a side elevation of an actuator made according to the invention with parts broken away for clarity;

FIG. 3 is a somewhat schematic, developed view of a cam employed in the invention;

FIG. 4 a schematic view of an air foil employed in an aircraft and having a control surface with which the actuator may be desirably used.

DESCRIPTION OF THE PREFERRED EMBODIMENT

Figure 2:
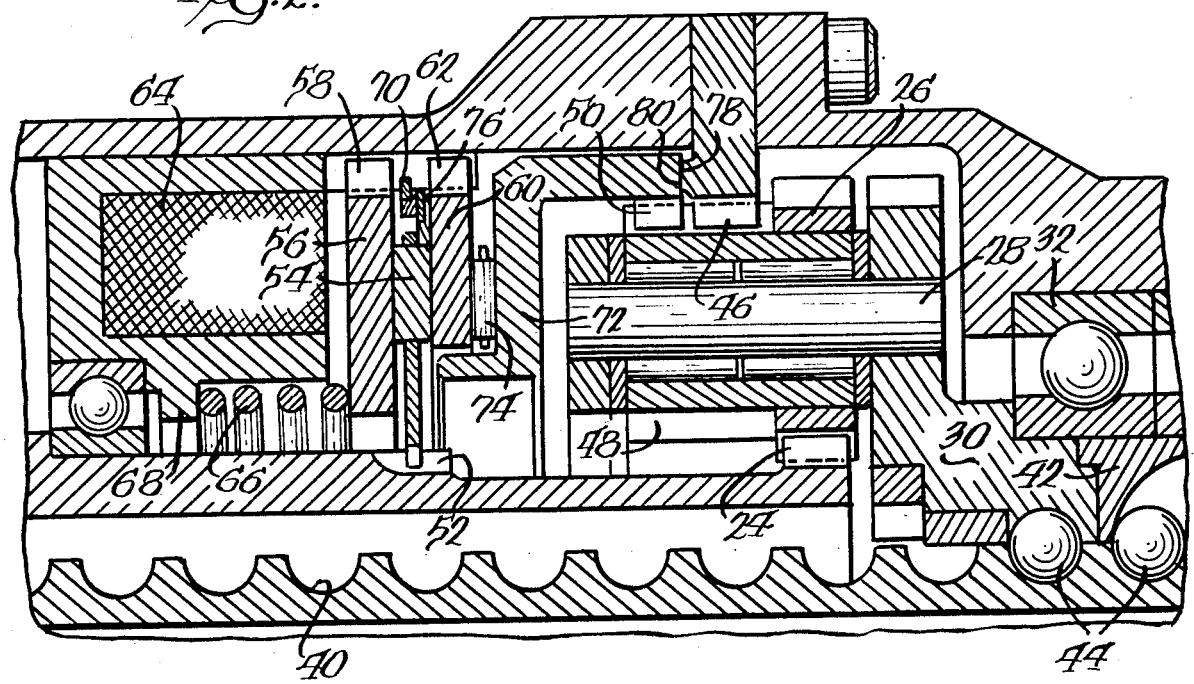
FIG. 2 is an enlarged, fragmentary view of a portion of the actuator.

An exemplary embodiment of a fail safe actuator made according to the invention is illustrated in the drawings and will be described herein in connection with positioning of control surfaces on aircraft. However, it is to be understood that the actuator may be used with efficacy in any type of system wherein one element is to be positioned with respect to another and it is desired to brake movement of the positionable element near its extremes of travel or where it is desirable to hold a positionable element in a given position in the event of system breakdowns.

With reference to FIG. 1, the invention includes a generally cylindrical housing 10 having one or more apertured ears 12 at one end thereof by which the housing 10 may be pivotably affixed to a mounting structure.

Within the housing is a high performance electric motor, generally designated 14, which may be, for example, a rare earth permanent magnet motor. The motor 14 includes a stator 16 and a rotor 18 journalled for rotation by a tubular shaft 20 journalled at one end by bearings 22.

As perhaps best seen in FIG. 2, at its opposite end, the shaft 20 terminates in a gear formation 24 which is meshed with planet gears 26 (only one of which is shown). The planet gears 26 are journalled on stub shafts 28 secured to a rotatable carrier 30. The carrier 30 is journalled by means of bearings 32 within the housing 10 and by means of this arrangement, the end of the shaft 20 carrying the gear formation 24 is likewise journalled.

The end 34 of the housing 10 opposite the ears 12 is defined by a cap having a central opening 36 through which an elongated actuating arm 38 slidably extends. The actuating arm 38 extends inwardly into the housing 10 and into the tubular shaft 20 as seen in FIG. 1. The same also includes a helical groove 40 whose cross section is spherical.

The radially inner portion of the carrier defines a ball nut 42 of conventional construction and a series of balls 44 are disposed in the groove 40 at the interface with the ball nut 42. As a consequence of this construction, it will be appreciated that when the carrier 30 rotates, the ball nut 42 will likewise rotate thereby moving the balls 44 along the groove 40 to advance or retract the actuating arm 38 out of or into the housing 10. Thus, the ball nut 42 serves to convert rotary motion to reciprocating motion and the reverse.

The planetary gear system defined by the gear formation 24 which serves as a sun gear, and the planet gears 26, also includes a stationary ring gear 46 meshed with a reduced diameter portion 48 of the planet gear 26. The planetary gear system is completed by a rotatable ring gear 50 in side by side relation to the ring gear 46 and also meshed with the reduced diameter portion 48 of the planet gears 26.

In a preferred embodiment, the gear formation 24 has thirty-five teeth while the large diameter portion of the planet gear 26 has twenty-five teeth. The reduced diameter portion 48 of the planet gears 26 has fifteen teeth, the stationary ring gear 46 seventy-five teeth and the rotatable ring gear 50 seventy-two teeth.

As a consequence of this interrelationship of teeth, it will be appreciated that rotation of the shaft 20 will result in the planet gears 26 rotating on the stub shaft 28 as well as revolving about the axis of the shaft 20 since they are meshed with the stationary ring gear 46. This in turn will rotate the carrier 30 and provide the forementioned rotation of the ball nut 42. For one direction of rotation of the shaft 20, the actuator arm 38 will be extended and for the opposite direction of rotation, the actuator arm 38 will be retracted.

A spline 52 on the shaft 20 mounts a brake element in the form of a friction plate 54 for axial movement along the shaft 20 while, at the same time, mounting the friction plate 54 for rotation with the shaft 20. A reaction plate 56 to one side of the friction plate 54 is held against rotation by a spline 58 on the interior wall of the housing 10. The spline 58 allows the reaction plate 56 to move axially into and out of engagement with the friction plate 54.

A second reaction plate 60 is similarly mounted by a spline 62 for movement towards and away from the friction plate 54 on the side thereof opposite from the reaction plate 56.

An annular motor in the form of a solenoid 64 is disposed within the housing 10 in close proximity to the reaction plate 56. The arrangement is such that when the solenoid 64 is energized, the reaction plate 56 will be moved to the left as viewed in FIG. 2 and out of engagement with the friction plate 54. When the solenoid 64 is de-energized, a compression coil spring 66 surrounding the shaft 20 and interposed between the reaction plate 56 and a shoulder 68 on the solenoid will move the reaction plate 56 toward engagement with the friction plate 54. An annular shoulder 70 which may be in the form of a snap ring received in a groove in the spline defining the splines 58 and 62, serves to limit rightward movement of the reaction plate 56 for purposes to be seen.

Returning to the rotatable ring gear 50, the same includes a radially inwardly directed web 72 in close proximity to the second reaction plate 60. Interposed between the two is a thrust bearing 74. Thus, if the ring gear 50 is moved to the left as viewed in FIG. 2, such movement will be imparted to the second reaction plate via the thrust bearing 74 to engage the second reaction plate 60 with the friction plate 54. An annular wavy spring 76 interposed between the shoulder 70 and the lefthand side of the second reaction plate 60 is operable to normally bias the latter to the right as viewed in FIG. 2, that is, out of engagement with the friction plate 54.

As seen in FIG. 2, the stationary ring gear 46 has a cam surface 78 aligned with and facing a cam surface 80 on the rotatable ring gear 50. This cam surface is shown in developed form in FIG. 3 and may include, for example, two lobes 82 defining the cam surface 80 and directed toward the cam surface 78. The lobes 82 are spaced by 180°. If desired, more lobes, equally angularly spaced, could be utilized. The purpose of multiple lobes is to assure that cam loading is equal from one side of the ring gear 50 to the other to assure that the same will not cant.

The cam surface 78, as shown in FIG. 3 includes lobes 84 spaced 180° as well as lobes 86, also spaced 180°.

It will be appreciated that as the ring gear 50 rotates relative to the ring gear 46, the lobes 82 on the former may align with either the lobes 84 or the lobes 86 on the latter. When such occurs, the ring gear 50 will be cammed to the left as viewed in FIG. 2 to drive the second reaction plate 60 toward engagement with the friction plate 54.

The location and number of the sets of the lobes 84 and 86 may be varied as desired as will be appreciated from the consideration of FIG. 4 hereinafter. Because brake engaging movement of the first reaction plate 56 is limited by the shoulder 68 and the friction plate 54 may axially shift on the spline 52, the shaft 20 cannot be braked except when both of two events are simultaneously occurring: First, the solenoid 64 must be deenergized, and second, the movable ring gear 50 must be cammed to the left as seen in FIG. 2. When only one of these events is occurring, the ability of the friction plate 54 to shift axially away from the coresponding reaction plate 56 or 60 prevents braking from occurring.

Thus, in normal operation, the motor 14 is energized appropriately to position and maintain the actuating arm 38 at a desired location, and the solenoid 64 only need be energized if the arm 38 is in a braked position and it is desired to move it to another position. A typical usage will now be described. FIG. 4 illustrates, for example, an aircraft wing 90 having a control surface such as a flap pivotally secured to its trailing edge. A position of the flap 90 is shown in solid lines at A and two differing positions in dotted lines at B and C. For purposes of description, it may be assumed that position A represents an aerodynamically neutral position whereas position C illustrates a braked position of the flap 92 at an extreme of travel. Possition B is an intermediate position. Assume for example that the flap 92 is in position C and, due to some sort of failure, the motor 42 cannot be energized to drive the actuator 38 to retract the flap 92 to position A, a desirable aerodynamically neutral position. Under the circumstance, the solenoid 64 may be momentarily energized to release braking engagement between the friction plate 54 and the reaction plates 56 and 60 by allowing the plates 54 and 60 to separate. Aerodynamic forces acting upon the flap 92 will tend to move it toward position A and the resulting movement will cause the arm 38 to be moved and such movement will be conveyed to the planetary gear system via the ball nut 42 to thus cause rotation of the ring gear 50. The lobes 84 may be located on the ring gear 46 such that when the flap has moved to position A, the simultaneous movement of the ring gear 50 will have brought the lobes 82 into engagement with the lobes 84 thereby camming the ring gear 50 to the left as viewed in FIG. 2 to engage the brake via the reaction plate 60 thereby halting further movement of the flap 92 and braking the same in the aerodynamically neutral position A.

Alternatively, the flap may be in positions A or B and it is desirable to move the same to position C. The solenoid 64 may be momentarily energized to release the braking and the motor 14 energized to cause the appropriate movement. Again, as the movement occurs, the ring gear 50 will rotate. In this case, it may be desirable to brake movement of the flap 92 just as it reaches its extreme of travel (position C) to prevent the imposition of stress on structural components of the system. In such a case, the cam lobes 86 may be so located on the ring gear 46 that the simultaneous movement of the ring gear 50 will cause the lobes 82 to align with the lobes 86 and again brake the movement via engagement of the brake through the reaction plate 60, assuming the solenoid 64 as since been deenergized.

Where the position of the flap 92 is being maintained by applying sufficient energy to the motor 14 so as to just match the reverse torque applied to the system by aerodynamic forces acting on the flap 92 and without braking the system whatsoever, should there occur an electrical failure in the motor 14, the balancing torque of the motor 14 will be removed allowing the flap to move to the aerodynamically neutral position under the influence of the aerodynamic forces applied thereto. Again, the brake will be engaged via leftward movement of the ring gear 50 in response to rotation thereof via the system as previously described.

Figure 5:
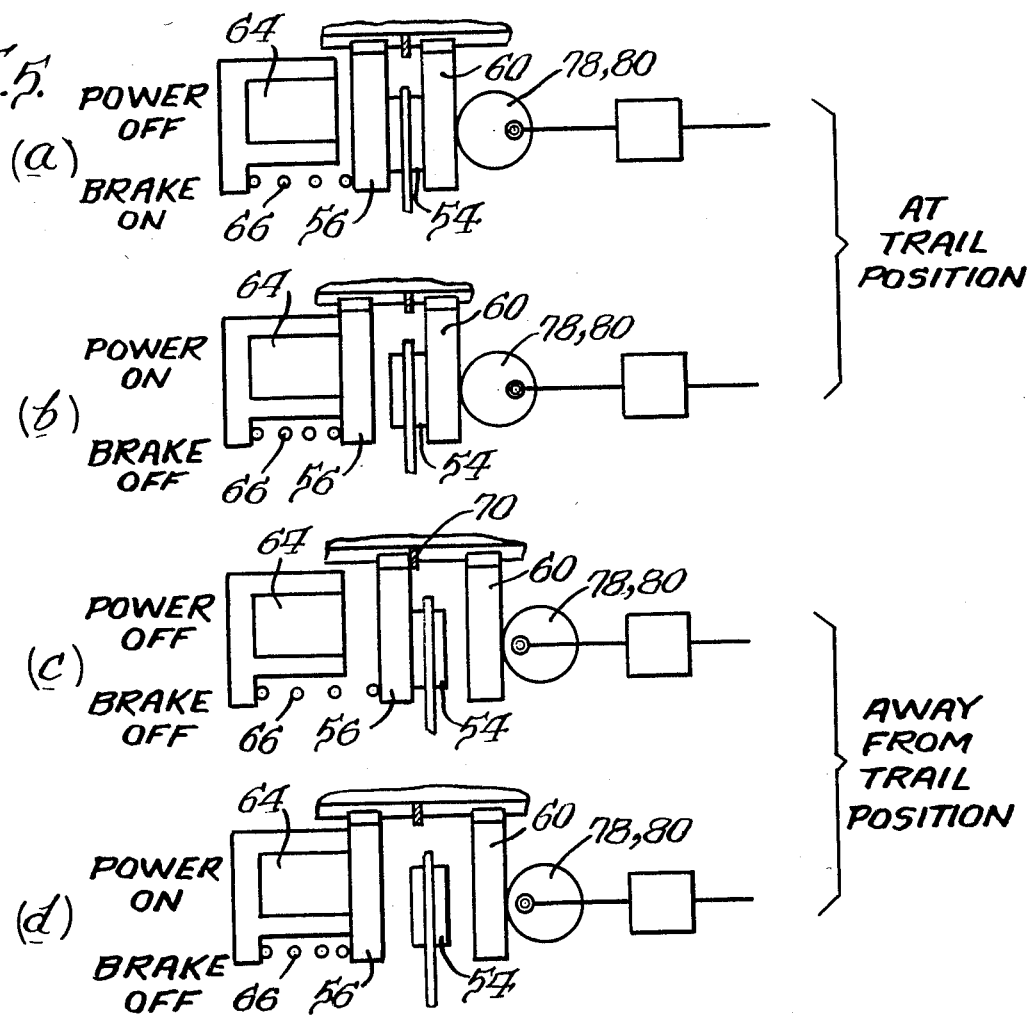
FIG. 5 is a functional schematic composed of FIGS. 5A–5B illustrating various modes of operation of the actuator.

FIG. 5 illustrates the various conditions which the system may assume. In FIG. 5A, the solenoid 64 is de-energized and the spring 66 has moved the reaction plate 56 into engagement with the friction plate 54. Similarly, the cam surfaces 78, 80 have acted to move the reaction plate 60 into engagement with the friction plate 54 and the system will be braked.

FIG. 5B shows the configuration where the solenoid 64 is energized. Thus, the reaction plate 56 will not be engaged with the friction plate 54. The cam 78, 80 has again moved the reaction plate 60 to the left into engagement with the friction plate 54 but the engagement will be merely one of touching and not of braking. Thus, the brake is off.

FIG. 5C shows situation identical to FIG. 5A except that the cam 78, 80 has moved to the right allowing reaction plate 60 to move away from the friction plate 54. Again, the brake is off, even though the friction plate 54 is in touching engagement with the reaction plate 56.

FIG. 5D shows the condition where both reaction plates 56 and 60 are out of contact with the friction plates 54, and again, the brake is off.

From the foregoing, it will be appreciated that through an actuator made according to the invention, the position of a control surface or the like can be controlled through suitable energization of a motor 14 under normal circumstances. In the case of mechanical or electrical difficulties, the system permits movement of the actuating arm to some desired position including some situation when it is impossible to disengage the normal brake defined by the reaction plate 56 through energization of the solenoid as, for example, shown in FIG. 5C.

Once the desired position is attained, braking is achieved as a result of rotation of the cam surfaces 78 and 80, even though electrical power may not be available as schematically represented in FIG. 5A.

Assuming the system is operating normally, even when the brake is engaged through rotation of the cam 78, 80 as shown in FIG. 5B, the change in the system configuration can be achieved simply by momentarily energizing the solenoid 64 to disengage the brake and by driving the motor 14 as schematically illustrated in 5B or D.

At the same time, it appreciated that the system may be advantageously employed to brake system movement near the limits of travel to avoid imposition of stress on system components.

I claim:

1. An actuator comprising:
 a motor having a rotary output;
 an actuating arm mounted for reciprocating movement along a path;
 a mechanism, including a rotary element, interconnecting said output and said arm and operable to convert rotary motion to reciprocating motion and the reverse;
 a friction plate rotatable in response to rotation of said output;
 first and second brake reaction plates mounted for independent movement into and out of engagement with said friction plate and held against rotation;

selectively operable control means for moving said first reaction plate into or out of engagement with said friction plate; and means including a cam driven by said rotary element, for moving said second reaction plate into and out of engagement with said friction plate at at least one predetermined position of said arm along said path.

2. The actuator of claim 1 wherein said mechanism includes a ball nut and a planetary reduction gear train.

3. The actuator of claim 2 wherein said rotary output drives a sun gear in said planetary gear train and said ball nut is driven by a planet gear meshed with said sun gear, a stationary first ring gear meshed with said planet gear, said rotary element comprising a second ring gear meshed with said planet gear, the teeth on said ring gear and said planet gear being constructed and arranged such that said second ring gear will rotate relative to said first ring gear upon rotation of said planet gear.

4. The actuator of claim 3 wherein said first and second ring gears are in side by side relation and said second ring gear is movable axially relative to said first ring gear; said cam being located at the interface of said ring gears.

5. The actuator of claim 1 wherein said friction plate is located centrally of said first and second reaction plates and is mounted for axial movement on said output and rotary movement therewith.

6. The actuator of claim 5 wherein said control means includes a spring biasing said first reaction plate toward engagement with said friction plate and further including means for limiting movement of said first reaction plate toward engagement with said friction plate.

7. An actuator comprising:
a motor having a rotary output;
an actuating element mounted for movement through a path;
a gear reduction mechanism, including a rotary element, interconnecting said output and said arm element and operable to move said arm element through said path;
a friction brake element rotatable in response to rotation of said output;
first and second brake reaction elements mounted for independent movement into and out of engagement with said friction brake element and held against rotation;
selectively operable control means for moving said first reaction element into or out of engagement with said friction brake element; and
means including a cam associated with said rotary element, for moving said second reaction element into and out of engagement with said friction brake element at at least one predetermined position of said actuating element along said path.

8. The actuator of claim 7 wherein said actuating element is an arm.

9. The actuator of claim 8 wherein said arm is mounted for reciprocating movement and said movement through a path is reciprocating movement.

10. The actuator of claim 7 wherein said brake reaction elements are mounted for axial movement into and out of engagement with said friction brake element and said brake elements comprise plates.

11. An fail safe actuator comprising:
a motor having a rotary output;
an actuating element mounted for reciprocating movement through a path;
a gear reduction mechanism, including a rotary element, interconnecting said output and said arm element and operable to move said element through said path;
a friction plate rotatable in response to rotation of said output;
first and second brake reaction plates mounted for independent axial movement into and out of engagement with said friction plate and held against rotation;
selectively operable control means for moving said first reaction plate into or out of engagement with said friction plate including a spring biasing said first plate toward said friction plate and a motor for moving said first plate out of engagement with said friction plate;
means including a cam associated with said rotary element, for moving said second reaction plate into engagement with said friction plate at at least one predetermined position of said arm along said path; and
a further spring for biasing said second plate away from said further plate.

12. The actuator of claim 11 wherein said mechanism includes a ball nut and a planetary reduction gear train.

13. The actuator of claim 12 wherein said rotary output drives a sun gear in said planetary gear train and said ball nut is driven by a planet gear meshed with said sun gear, a stationary first ring gear meshed with said planet gear, said rotary element comprising a second ring gear meshed with said planet gear, the teeth on said ring gear and said planet gear being constructed and arranged such that said second ring gear will rotate relative to said first ring gear upon rotation of said planet gear.

14. The actuator of claim 13 wherein said first and second ring gears are in side by side relation and said second ring gear is movable axially relative to said first ring gear; said cam being located at the interface of said ring gears.

* * * * *